United States Patent [19]

Yao

[11] 4,354,247

[45] Oct. 12, 1982

[54] OPTICAL COSINE TRANSFORM SYSTEM

[75] Inventor: Shi-Kay Yao, Anaheim, Calif.

[73] Assignee: Rockwell International Corporation, El Segundo, Calif.

[21] Appl. No.: 154,359

[22] Filed: May 29, 1980

[51] Int. Cl.³ .......................... G06F 7/56; G02F 1/11

[52] U.S. Cl. .................................... 364/713; 350/358

[58] Field of Search ...................... 364/713, 822, 827; 350/358

[56] References Cited

U.S. PATENT DOCUMENTS 4,126,834 11/1978 Coppock ............................ 350/358
4,308,521 12/1981 Casasent et al. ................ 340/146.3

OTHER PUBLICATIONS

Proceedings of the IEEE, vol. 65, No. 1, Jan. 1977, pp. 143–157, "Spatial Light Modulators", David Casasent.
"Optical Signal Processing", D. Casasent, from *Optical Computing*, Ed. Springer-Verlag, N.Y.
"Integrated Optic Spectrum Analyzer", M. K. Barnolski et al., IEEE Transaction on Circuits and Systems, vol. CAS-26, #12, 12/79.
D. Psaltis et al., "General Formulation for Optical Signal Processing Architectures", Opt. Eng., Mar./Apr. (1980), vol. 19, No. 2, pp. 193–198.

*Primary Examiner*—Bruce Y. Arnold
*Attorney, Agent, or Firm*—H. Fredrick Hamann; Daniel R. McGlynn

[57] ABSTRACT

An optical system for performing a cosine transform on an input RF signal is described. The optical system includes a source for emitting a beam of radiation, and an acoustic-optical modulation device disposed in the path of the beam and functioning to modulate at least two spaced-apart spatial portions of the beam with different signals to produce two modulated beams.

A Fourier transfer lens is provided which is disposed in the path of the two modulated beams for combining the two beams, and a detector is disposed in the path of the Fourier transform beam at the focal plane of the Fourier transfer lens.

10 Claims, 2 Drawing Figures

OPTICAL COSINE TRANSFORM SYSTEM

CROSS REFERENCE TO RELATED APPLICATIONS

This application is related to the concurrently filed and copending U.S. patent applications Ser. Nos. 154,358 and 154,246, assigned to the assignee of the present application.

BACKGROUND OF THE INVENTION

1. Field of the Invention

The invention relates to optical systems, and more particularly to an arrangement of optical elements for performing optical signal processing.

2. Description of Prior Art

The use of optical elements for simple, coherent optical signal processing is well known in the art. Processing functions such as matrix multiplication, Fourier transform, and convolutions can be performed using coherent optical processing. Such systems have been constructed from bulk three dimensional elements such as lenses, bulk modulators, and two dimensional detector arrays. Another important application is the spectral analysis of RF signals.

The optical RF spectrum analyzer described in the prior art employs the interaction between a coherent optical wave and an acoustic wave driven by an input electrical signal to determine the power spectral density of the input. Such an analyzer may be implemented in an integrated optics version, and is described in the article "Integrated Optic Spectrum Analyzer," M. K. Barnowski, B. Chen, T. R. Joseph, J. Y. Lee, and O. G. Rama, IEEE Trans. on Circuits and Systems, Vol. CAS-26, No. 12, Dec. 1979. The integrated optics version consists of an injection laser diode, a thin-film optical waveguide, waveguide lens, a surface acoustic wave transducer, and a linear detector array. The unit operates by mixing an incoming radar signal with a local oscillator such that the intermediate frequency is within the pass band of the transducer. After amplification, the signal is applied to the SAW transducer. The resulting surface acoustic waves traversing the optical waveguide generate a periodic modulation of the refractive index of the waveguide mode. If the culminated optical beam intersects the acoustic beam at the Bragg angle, a portion of the beam will be defracted or deflected at an angle closely proportional to the acoustic frequency with intensity proportional to the power level of the input signal. The Bragg detector light is then focused on an array of focal plane detectors where each detector output becomes one frequency channel of the spectrum analyzer. Such systems are limited to obtaining the intensity of the Fourier transform which is useful for determining the intensity of the incoming signal. However, the Fourier transformer alone and the knowledge of the intensity is insufficient to determine the amplitude of the individual frequency components.

SUMMARY OF THE INVENTION

Briefly, and in general terms, the invention provides an optical system including a source for emitting a beam of radiation; an acoustic-optical modulation device disposed in the path of the beam and functioning to modulate at least two spaced apart spatial portions of the beam with different signals to produce two modulated beams; a Fourier transfer lens disposed in the path of the two modulated beams; and a detector disposed in the path of the beams from the Fourier transfer lens at the focal plane thereof.

As will be shown mathematically, the interference of the two modulated waveforms produces not a Fourier transform but a cosine transform. It is known to those skilled in Fourier analysis that a Fourier transform is composed of subcomponent sine and cosine transform terms.

One of the important applications of an optical cosine transform system of the present invention is in an optical signal processor, such as that described in the Barnowski article cited above. While the Barnowski system utilizes a Fourier transform (which is composed of cosine and sine terms), the present invention permits the cosine transform alone to be implemented, thereby permitting the amplitude of individual cosine frequency components of the applied RF signal to be measured.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENT

Figure 1:
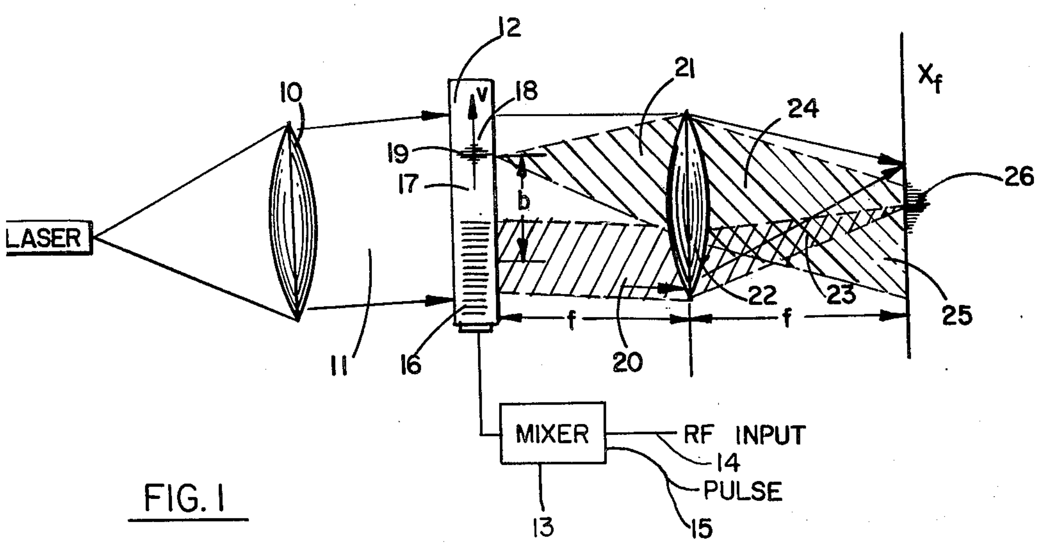
FIG. 1 shows a top plan view of an optical cosine transform system according to the present invention.

Turning now to FIG. 1 there is shown an arrangement of optical elements in the optical cosine transform system according to the present invention. To the left of the figure is shown a laser light source to provide a coherent beam of light. (The divergence of the beam is shown only for drafting convenience.) A collimation lens 10 is disposed in the path of the light beam which transforms the point source of light into an array of parallel beams 11. The parallel beams 11 then interact with an acoustic optic modulator 12 which is known in the art. The modulator 12 is driven by an electrical signal input produced by mixer 13. The mixer 13, or other similar electronic device, is used to combine an RF signal input 14 and a pulse generator signal 15 in an appropriate manner.

One of the appropriate means of combining the RF signal and the pulse generator is to break up the RF signal into discrete packets, and to produce an input signal sequence consisting of a reference pulse produced by the pulse generator, an interval with no signal, and the RF signal packet. A succession of the input signal sequences are applied to the input of the modulator 12.

Figure 2:
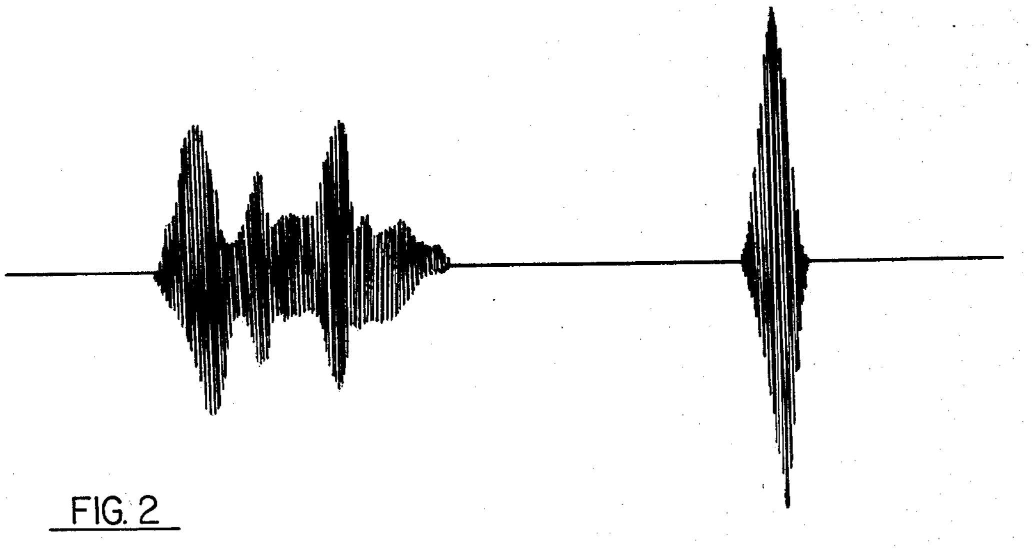
FIG. 2 shows an example of the waveforms applied to the acoustic optic modulator in the present invention.

The result of an input signal sequence being applied to the modulator 12 is illustrated in FIG. 1. On one portion 16 of the acoustic optic modulator 12 is provided an RF signal, while at another portion 17 is provided no signal, while yet at a third portion 18 is provided a delta pulse 19 as suggested by the waveform shown in FIG. 2.

The result of the interaction of the incoming parallel optical beams 11 with the portion 16 is to produce a modulated optical signal 20. The result of the interaction of the optical beam 11 with the pulse 19 is to produce a second modulated optical signal 21. Both of these series of waves are applied to Fourier transform lens 22. The Fourier transform lens takes both signals 20 and 21 and performs a Fourier transform producing rays 23 and 24 respectively. At the focal plane 25 the two wavefronts of the rays interact to produce a cosine transform pattern 26.

The above described arrangement functions as a real-time Fourier transform or cosine transform device. It is well known that an optical lens can do Fourier transform of images at the speed of light. A low-cost real-time input device can be built based upon acousto-optic techniques for optical Fourier transform. However, three points must be noted: a cosine transform is more desirable than Fourier transform; the phase of the transformed signal must be preserved through the square law photodetector; and the Doppler frequency shift in the transformed signal due to the acousto-optic input device must be removed if a simple detection scheme is desired. All these problems can be solved with the acoustic signal including a reference pulse of large amplitude separated from the input signal at a prescribed time interval, as provided by the present invention. The optical intensity distribution at the transform plane, which can be detected by a photodetector, is $$I_t = |Ae^{jbx_f}e^{-vtx_f} + F(x_f)e^{-jvtx_f}|^2$$
$$= A^2 + C(x_f)^2 + 2AC(x_f)\cos(bx_f - \phi)$$

where $F(x_f) = C(x_f)e^{j\phi}$ is the Fourier transform of the input signal;

$x_f$ is the coordinate variable on the detector plane along the acoustic propagation direction;

$x_f = \omega/v$ where $\omega$ is the signal angular frequency;

v is the acoustic velocity;

t is the time variable;

$\phi$ is the phase of the cosine transform components at $x_f$;

A is a constant.

When the parameter b is greater than 1.5 times the input signal length, the last term can be separated from the first two terms. The last term is the cosine transform of the input signal with its phase $\phi$ coded into the cos factor. It is also obtainable if $C(x_f)$ is much smaller than A.

The above scheme can be easily constructed with either bulk optical or integrated optical techniques as a low-cost real-time cosine transform device.

While the invention has been illustrated and described as embodied in an optical cosine transform system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention, and, therefore, such adaptations should and are intended to be comprehended within the meaning and range of equivalence of the following claims.

What is claimed is:

1. An optical signal processing system comprising:

means for providing an information containing input signal;

a source for emitting a beam of radiation;

collimation means in the path of said beam;

acoustic-optical modulation means disposed in the path of said collimated beam and functioning to modulate at least two spatially spaced-apart portions of said beam with different signals, to produce first and second spatially separated modulated beams, one of said signals being said information containing input signal and another of said signals being a predetermined reference signal;

Fourier transform lens means disposed in the path of said first and second modulated beams; and detector means disposed in the path of said first and said second beams and spaced apart from said Fourier transform lens means at the focal plane thereof for detecting the resulting optical intensity distribution of the interaction of said first and said second modulated beams, said resulting distribution representing a predetermined transfer function of said information containing signal.

2. An optical system as defined in claim 1, wherein said predetermined reference signal is a delta pulse signal.

3. An optical system as defined in claim 1, further comprising mixer means for producing a modulating signal connected to said acoustic-optical modulation means, said modulating signal consisting of a repeating time sequence of a first time interval including said predetermined reference signal, a second time interval of zero amplitude, and a third time interval including a portion of said information-containing input signal.

4. An optical signal as defined in claim 3, wherein said mixer means comprises:

packet generating means having an input connected to said means for providing an information containing input signal, and an output, said packet generating means functioning to represent said input signal as a sequence of discrete information containing packets;

said output connected to said means for producing a modulating signal for supplying one of said packets during said third time interval.

5. An optical signal processing system comprising:

means for providing an information containing signal;

a source for emitting a beam of radiation;

collimation means in the path of said beam;

acoustic-optical modulation means disposed in the path of said collimated beam and functioning to modulate at least two spatially spaced-apart portions of said beam with different signals one of said signals being said information containing signal, to produce first and second spatially separated modulated beams;

Fourier transform lens means disposed in the path of said first and said second modulated beams; and detector means disposed in the path of said first and said second beams and spaced apart from said Fourier transform lens means at the focal plane thereof for detecting the resulting optical intensity distribution of the interaction of said first and said second modulated beams, said resulting distribution being $$I_t = |Ae^{jbx_f}e^{-vtx_f} + F(x_f)e^{-jvtx_f}|^2$$
$$= A^2 + C(x_f)^2 + 2AC(x_f)\cos(bx_f - \phi)$$

where $F(x_f)=C(x_f)e^{j\phi}$ is the Fourier transform of the input signal;

$x_f$ is the coordinate variable on the detector plane along the acoustic propagation direction;

$x_f=\omega/v$, where $\omega$ is the signal angular frequency;

v is the acoustic velocity;

t is the time variable;

$\phi$ is the phase of the cosine transform components at $x_f$, and

A and b are constants.

6. An optical signal processing system comprising:

means for providing an information containing input signal;

a source for emitting a beam of radiation;

collimation means in the path of said beam;

acoustic-optical modulation means disposed in the path of said collimated beam and functioning to modulate at least two spatially spaced-apart portions of said beam with different signals one of said signals being said information containing signals to produce first and second spatially separated modulated beams;

mixer means connected to said acoustic-optical modulation means, and functioning to produce a modulating signal consisting of a repeating time sequence of a first time interval including a reference signal, a second time interval of zero amplitude, and a third time interval including a portion of said information-containing input signal;

Fourier transform lens means disposed in the path of said first and said second modulated beams; and detector means disposed in the path of said first and said second beams and spaced apart from said Fourier transform lens means at the focal plane thereof for detecting the resulting optical intensity distribution of the interaction of said first and second modulated beams, said resulting distribution representing a predetermined transfer function of said information containing signal.

7. An optical system as defined in claim 5, wherein said reference signal is a high amplitude signal of short duration.

8. An optical signal processing system comprising:

means for providing an information containing input signal;

a source for emitting a beam of radiation;

collimation means in the path of said beam;

acoustic-optical modulation means disposed in the path of said collimated beam and functioning to modulate at least two spatially spaced-apart portions of said beam with different signals to produce first and second spatially separated modulated beams, one of said signals being said information containing input signal;

mixer means connected to said acoustic-optical modulation means, and functioning to produce a modulating signal consisting of a repeating sequence of a first time interval including a portion of said information containing input signal, and a second time interval including a predetermined modulating signal;

Fourier transform lens means disposed in the path of said first and said second modulated beams; and detector means disposed in the path of said first and said second beams and spaced apart from said Fourier transform lens means at the focal plane thereof for detecting the resulting optical intensity distribution of the interaction of said first and said second modulated beams, said resulting distribution representing a predetermined transfer function of said information containing signal.

9. An optical system as defined in claim 8, wherein said predetermined modulating signal is a high amplitude signal of short duration.

10. An optical system as defined in claim 8, wherein said mixer means comprises an input connected to said means for providing an information containing input signal and an output connected to said acoustic-optical modulation means, said mixer means functioning to represent said input signal as a sequence of discrete information containing packets.

* * * * *